(12) United States Patent
Oya

(10) Patent No.: US 6,413,666 B1
(45) Date of Patent: Jul. 2, 2002

(54) BATTERY WITH A SHEATHING MEMBER TO PREVENT LEAKAGE OF ELECTROLYTIC SOLUTION

(75) Inventor: Kuniyasu Oya, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/698,897

(22) Filed: Oct. 27, 2000

(30) Foreign Application Priority Data

Oct. 27, 1999 (JP) .............................. 11-306129

(51) Int. Cl.⁷ .................................. H01M 2/12
(52) U.S. Cl. ................ 429/53; 429/54; 429/56; 429/175; 429/206
(58) Field of Search ............... 429/53, 54, 56, 429/175, 206

(56) References Cited

U.S. PATENT DOCUMENTS

| 3,442,716 A | 5/1969 | Muraki et al. |
| 3,967,977 A | * 7/1976 | Affeldt .................. 136/133 |
| 4,271,241 A | 6/1981 | Hooke et al. |
| 4,594,300 A | 6/1986 | Morioka et al. |

FOREIGN PATENT DOCUMENTS

| FR | 1423543 | 3/1966 |
| GB | 521084 | 5/1940 |
| JP | 55119344 | 11/1980 |

\* cited by examiner

*Primary Examiner*—Carol Chaney
*Assistant Examiner*—Dah-Wei D. Yuan
(74) *Attorney, Agent, or Firm*—Sonnenschein, Nath & Rosenthal

(57) ABSTRACT

A battery in which an electrolytic solution may be prevented from leakage. Within a battery case in the form of a bottomed tube, a positive electrode, a negative electrode and an electrolyte are arranged. An opening in the battery case is sealed by a battery lid having a degassing hole, which degassing hole is covered by a sheathing member.

11 Claims, 2 Drawing Sheets

BATTERY WITH A SHEATHING MEMBER TO PREVENT LEAKAGE OF ELECTROLYTIC SOLUTION

The present application claims priority to Japanese Application No. P11-306129 filed Oct. 27, 1999, which application is incorporated herein by reference to the extent permitted by law.

BACKGROUND OF THE INVENTION

1. Field of the Invention

This invention relates to a tubular-shaped battery.

2. Description of Related Art

Recently, an increasing number of electronic equipment are reduced in size and portable and can be run by batteries such as alkaline cells. In general, in order to vent a gas occurred in a battery on incorrectly charging the battery, a safety valve is provided in a portion of a battery sealing element to release the internal pressure in safety at a time point when the internal pressure in the battery is low.

The alkaline battery having the safety valve had a drawback that, if the battery is allowed to stand for prolonged time at elevated temperature, the safety valve itself undergoes chronological deterioration, such that the safety valve is actuated even if the internal pressure in the battery is low.

If the safety valve is actuated, leakage of the electrolytic solution contained in the battery occurs unavoidably. Should the leaking electrolytic solution be deposited e.g., on the skin, it is highly likely that the skin be thereby injured.

There is also known a battery in which a washer for preventing external shorting is mounted around the negative terminal. However, since this washer is not designed to completely cover the degassing hole of the negative terminal, it is not possible to prevent leakage of the electrolytic solution.

SUMMARY OF THE INVENTION

It is therefore an object of the present invention to provide a battery free of the above-described drawback of the prior art and to provide a battery capable of preventing leakage of the electrolytic solution.

According to the present invention, there is provided battery in which a positive electrode, a negative electrode and an electrolyte are arranged in a bottomed tubular battery case and in which an opening in the battery case is sealed by a battery lid having a degassing hole, wherein the degassing hole is covered by a sheathing member.

With the battery according to the present invention, in which the degassing hole formed in the battery lid is covered by the sheathing member to prevent the electrolytic solution from leaking through the degassing hole.

According to the present invention, the degassing hole formed in the battery case is covered by the sheathing member to prevent the leakage of the electrolytic solution through the degassing hole. Thus, the tubular battery of the present invention is extremely high in operational reliability.

DESCRIPTION OF THE PREFERRED EMBODIMENTS

Figure 1:
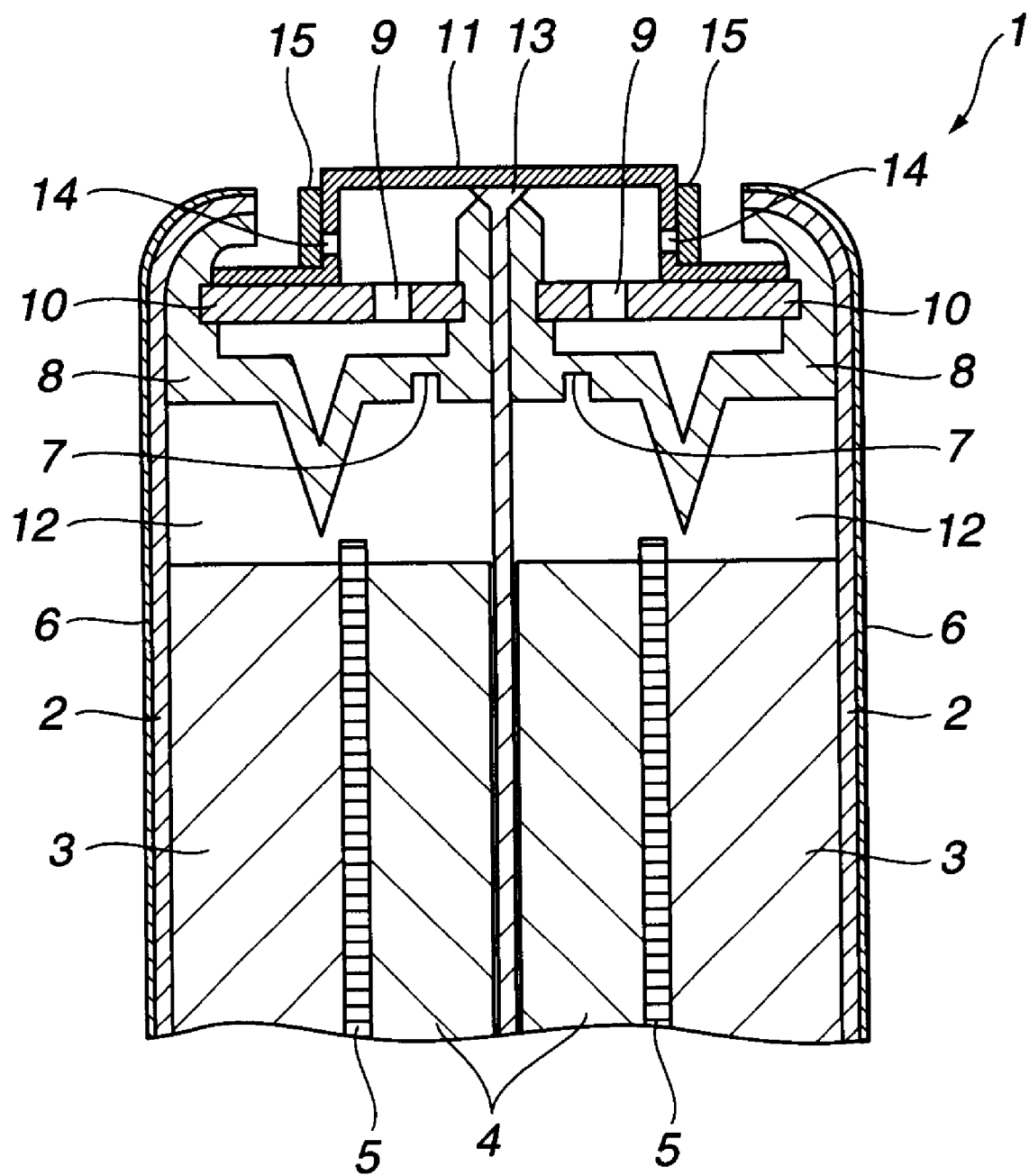
FIG. 1 is a cross-sectional view showing an illustrative structure of a cylindrically-shaped battery according to the present invention, and particularly showing essential portions thereof to an enlarged scale.

Referring to the drawings, preferred embodiments of the present invention will be explained in detail.

FIG. 1 shows an illustrative structure of a battery embodying the present invention. In this figure, and in FIG. 2, explained subsequently, only a sealing portion, essential to the battery of the present invention, is shown.

This cylindrically-shaped battery 1 includes, within a bottomed hollow positive electrode case 2 having an opening, a hollow cylindrically-shaped positive electrode 3, a separator 5 in the form of a bottomed cylinder arranged in abutting contact with the positive electrode 3, a negative electrode 4 mounted on an inner side of the separator 5 and an electrolytic solution taking charge of ionic conduction. The cylindrically-shaped battery 1 also includes a sealing unit for sealing an opening of the positive electrode case 2. The cylindrically-shaped battery 1 has its cylindrical outer peripheral surface coated with an exterior label 6.

The positive electrode 3 is comprised of a cylindrically-shaped hollow positive electrode mixture of e.g., manganese dioxide, graphite and an aqueous solution of potassium hydroxide, arranged along the inner wall surface of the positive electrode case 2.

The negative electrode 4 is comprised of a gelated negative electrode mixture containing particulate zinc, an aqueous solution of potassium hydroxide and a thickener etc, and is charged into the inside of a bottomed cylindrical separator 5.

The separator 5 is formed e.g., of a non-woven polyolefinic cloth, and is mounted in abutting contact with the hollow portion of the cylindrically-shaped positive electrode 4.

The sealing unit includes, within the opening of the positive electrode case 2, a sealing member 8 fitted with a safety valve 7, a reinforcement member 10 having a releasing opening 9, and a negative electrode terminal 11, assembled in this order.

If these components are explained in more detail, the sealing member 8 is fitted to overlie an air chamber 12 to seal the opening part of the positive electrode case 2. The safety valve 7 in the form of a reduced thickness portion is provided by forming a recessed portion in the sealing member 8 for facing the air chamber 12. This safety valve 7 is cleft on the occasion of elevation in the internal pressure in the battery to release the internal pressure.

The sealing member 8 has a central through-hole via through which is forcedly intruded a needle-like current collecting pin 13. This current collecting pin 13, formed e.g., of brass, is forcedly fitted in the center through-hole of the sealing member 8, and is welded to the negative electrode terminal 11.

The reinforcement member 10 compresses against the sealing member 8 to reinforce the sealing member 8, and includes a release opening 9.

The negative electrode terminal 11 is provided with a degassing hole 14, on a peripheral surface of a center projection thereof, for releasing the battery internal pressure.

In the cylindrically-shaped battery 1 of the present invention, a ring-shaped sheathing member 15 is mounted on the peripheral surface of the negative electrode terminal 11. This sheathing member 15 covers the degassing hole 14 formed in the negative electrode terminal 11.

In the above-described cylindrically-shaped battery 1, having the sealing unit, gases occurred due to overcharging are accumulated in the air chamber 12. If the internal pressure in the air chamber 12 is increased beyond a prescribed value, the safety valve 7 is cleft under the elevated internal pressure. This gas is allowed to pass through the safety valve 7 to exit at the release opening provided in the reinforcement member 10.

However, should chronological deterioration occur on prolonged storage under elevated temperatures, there are occasions where the safety valve 7 is actuated to release the battery internal pressure even if the internal pressure value is small. In such case, the electrolytic solution charged into the battery is passed through the cleft safety valve 7 in the sealing member 8 to exit to outside through the degassing hole 14 bored in the negative electrode terminal 11.

According to the present invention, since the sheathing member 15 covers the degassing hole 14 from outside, there is no risk of the electrolytic solution leaking to outside.

This sheathing member 15 is preferably formed of a flexible resin. The materials for the sheathing member 15 may be enumerated by, for example, polyamide resin, polyolefin resin and a polyolefinic thermoplastic elastomer.

There is no particular limitation to the shape of the sheathing member 15 provided that it is such a shape capable of stopping the degassing hole 14 formed in the negative electrode terminal 11.

For example, the sheathing member 15 may be shaped not only to cover the outer peripheral portion of the negative electrode terminal 11 formed with the degassing hole 14 but also to include a flange 15a to stop the gap between the negative electrode terminal 11 and the positive electrode case 2. By stopping the gap between the negative electrode terminal 11 and the positive electrode case 2, by the flange 15a of the sheathing member 15, the electrolytic solution which happens to leak through the degassing hole 14 in the sheathing member 15 may be prohibited by the flange 15a from flowing to outside the battery. That is, the flange 15a of the sheathing member 15 provides for dual prevention of the effluence of the electrolytic solution to improve the reliability of the battery further.

On the other hand, if the battery internal pressure is raised due to e.g., electrical charging, such that the safety valve 7 of the sealing member 8 of plastics material is in operation as usual, the sheathing member 15, formed of the plastics or the elastomeric material as described above, is deformed under an elevated pressure applied thereto. In such case, a gap is formed between the negative electrode terminal 11 and the sheathing member 15 to release the internal pressure. So, the battery operates as usual without undergoing destruction.

The sheathing member 15 preferably has its surface coated with one or more of asphalt, chlorosulfonated polyethylene and polyamide resin. By having the surface of the sheathing member 15 coated with one or more of asphalt, chlorosulfonated polyethylene and polyamide resin, it is possible to improve adhesion between the sheathing member 15 and the negative electrode terminal 11 to prevent leakage of the electrolytic solution more reliably.

The portion of the negative electrode terminal 11 in abutting contact with the sheathing member may be coated with one of asphalt, chlorosulfonated polyethylene or a polyamide resin. In such case, tight adhesion between the sheathing member 15 and the negative electrode terminal 11 may be improved to prevent leakage of the electrolytic solution more reliably.

In the above-described embodiment, an alkaline battery is taken as an example. However, the present invention is not limited thereto and may be applied to a wide variety of batteries, including cylindrically-shaped batteries, such as a cylindrically-shaped air battery or cylindrically-shaped chargeable alkaline-manganese battery. The present invention may be applied not only to the cylindrically-shaped batteries but also to square-shaped batteries.

EXAMPLE

Figure 2:
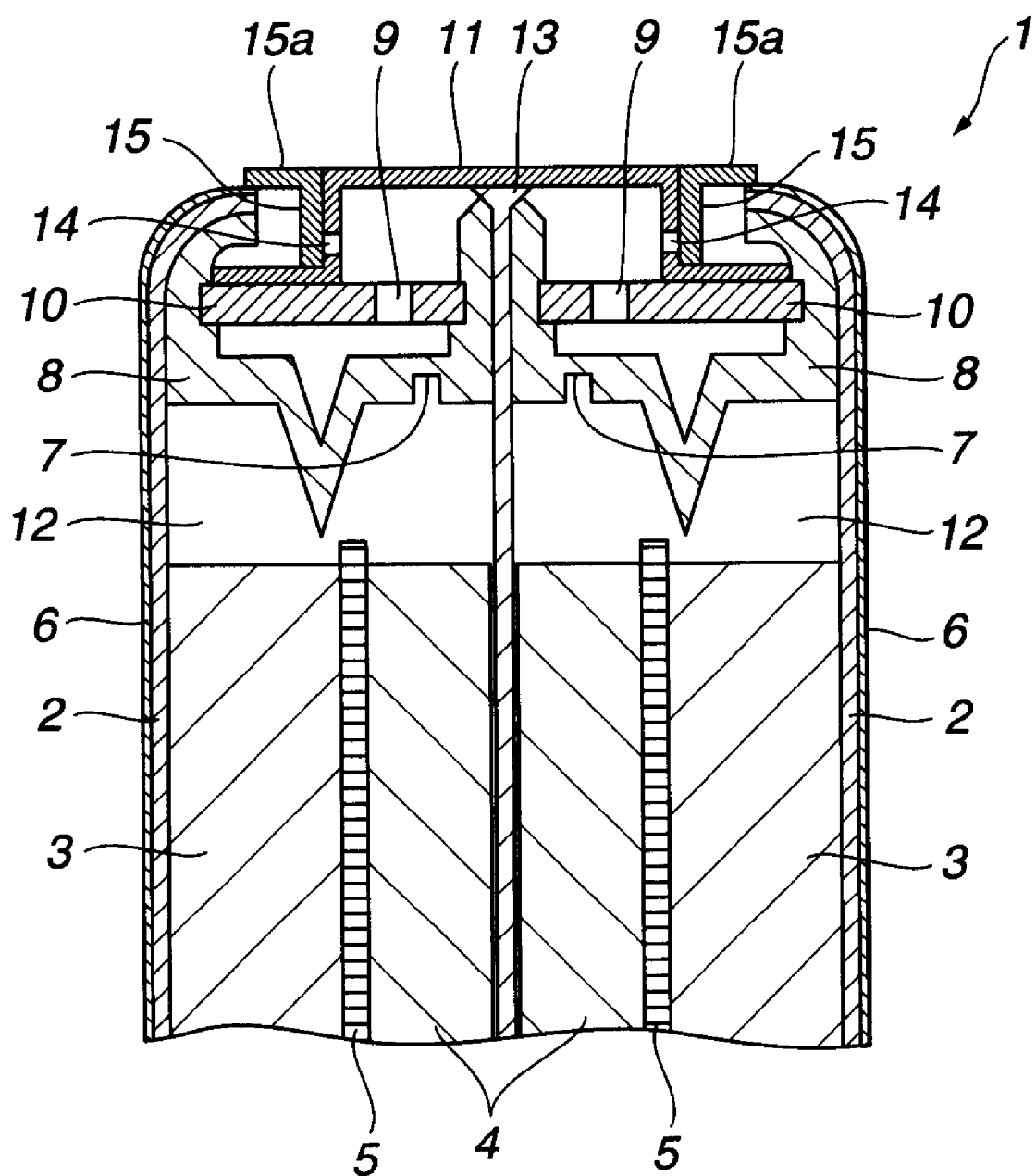
FIG. 2 is a cross-sectional view showing another illustrative structure of a cylindrically-shaped battery according to the present invention, and particularly showing essential portions thereof to an enlarged scale.

For confirming the effect of the present invention, a cylindrically-shaped alkaline battery, configured as shown in FIG.2, was prepared, and evaluation was made of its reliability against battery leakage.

Example 1

First, manganese dioxide, graphite and a 39%-aqueous solution of potassium hydroxide were mixed together homogeneously at a pre-set ratio to prepare a positive electrode mixture. 3.6 g of this positive electrode mixture was then provisionally molded to a ring shape with an outer diameter of 13.2 mm, an inner diameter of 9.1 mm and a height of 15.0 mm.

Three of provisionally molded positive electrode mixtures were inserted into the inside of the cylindrically-shaped positive electrode case 2, which then was pressured from above at a pressure of 1 ton/cm$^2$.

Into the hollow portions between the positive electrode mixtures were inserted bottomed cylindrically-shaped separators, into which a 39%-aqueous solution of potassium hydroxide and the negative electrode mixture were charged. The opening portion of the positive electrode case was tightly sealed by a sealing unit to prepare a cylindrically-shaped alkaline battery.

A 6,6 nylon ring is loaded on the outer periphery of the negative electrode terminal constituting the sealing unit. This ring sheathes the degassing hole formed in the negative electrode.

Example 2

A cylindrically-shaped alkaline battery was prepared in the same way as in Example 1, except using a polypropylene ring as a ring mounted on the negative electrode, Example 3

A cylindrically-shaped alkaline battery was prepared in the same way as in Example 1, except using a ring of polyolefinic thermoplastic elastomer as a ring mounted on the negative electrode.

Example 4

A cylindrically-shaped alkaline battery was prepared in the same way as in Example 1 except using a polypropylene ring, the periphery of which is coated with asphalt, as a ring mounted on the negative electrode.

Example 5

A cylindrically-shaped alkaline battery was prepared in the same way as in Example 1 except using a polypropylene ring, the periphery of which is coated with chlorosulfonated polyethylene, as a ring mounted on the negative electrode.

Example 6

A cylindrically-shaped alkaline battery was prepared in the same way as in Example 1, except using a polypropylene ring, the periphery of which is coated with 6,10-nylon, as a ring mounted on the negative electrode.

Example 7

A cylindrically-shaped alkaline battery was prepared in the same way as in Example 1 except using a polypropylene ring as a ring mounted on the negative electrode and applying an asphalt coating on a portion of the negative electrode on which to mount the ring.

Example 8

A cylindrically-shaped alkaline battery was prepared in the same way as in Example 1 except using a polypropylene ring as a ring mounted on the negative electrode and applying a chlorosulfonated polyethylene coating on a portion of the negative electrode on which to mount the ring.

Example 9

A cylindrically-shaped alkaline battery was prepared in the same way as in Example 1 except using a polypropylene ring as a ring mounted on the negative electrode and applying a 6,10-nylon coating on a portion of the negative electrode on which to mount the ring.

Comparative Example

A cylindrically-shaped alkaline battery was prepared in the same way as in Example 1 except not mounting a ring.

Ten each of the batteries of the Examples 1 to 9 and the Comparative Example were prepared as described above. For confirming the meritorious effect of the present invention, these batteries were allowed to stand at ambient temperature for three months, with the safety valves of the sealing members punched at the outset. After the batteries were allowed to stand for three months, the number of batteries, in which the occurrence of leakage of the electrolytic solution could be confirmed on visual inspection, was counted. The results are shown in Table 1.

In particular, in the batteries of the Examples 4 to 9 in which the coating is applied to the rings or to the negative electrode terminals, leakage can be suppressed to zero. Thus, it may be seen that, by applying the coating to the ring or to the negative electrode terminal, it is possible to improve the bonding between the ring and the negative electrode terminal to prevent leakage of the electrolytic solution more reliably.

What is claimed is:

1. A battery comprising:

a positive electrode, a negative electrode, and a liquid electrolyte arranged in a bottomed tubular battery case;

a sealing member fitted on said battery case, said sealing member having a safety valve;

an electrode terminal formed above said sealing member, said electrode terminal having a degassing hole;

a sheathing member covering said degassing hole.

2. The battery according to claim 1 wherein said battery case is in the form of a bottomed cylinder.

3. The battery according to claim 1 which is a alkaline battery employing an alkaline electrolytic solution as said electrolytic solution.

4. The battery according to claim 1 wherein said sheathing member is formed of one or more of a polyamide resin, a polyolefinic resin and a polyolefinic thermoplastic elastomer.

5. The battery according to claim 1 wherein said sheathing member has its surface coated with one or more of asphalt, chlorosulfonated polyethylene and a polyamide resin.

6. The battery according to claim 1 wherein a portion of said battery lid contacting said sheathing member is coated with one or more of asphalt, chlorosulfonated polyethylene and a polyamide resin.

7. The battery according to claim 1 wherein said sheathing member is ring-shaped.

8. The battery according to claim 1 wherein said sheathing member has a flange.

TABLE 1

|  | ring material | ring coating material | negative electrode terminal coating material | number of times of occurrence of leakage |
|---|---|---|---|---|
| Ex. 1 | 6,6-nylon | — | — | 3 |
| Ex. 2 | polypropylene | — | — | 2 |
| Ex. 3 | polyolefinic thermoplastic elastomer | — | — | 0 |
| Ex. 4 | polypropylene | asphalt | — | 2 |
| Ex. 5 | polypropylene | chlorosulfonated polyethylene | — | 0 |
| Ex. 6 | polypropylene | 6,10-nylon | — | 0 |
| Ex. 7 | polypropylene | — | asphalt | 0 |
| Ex. 8 | polypropylene | — | chlorosulfonated polyethylene | 0 |
| Ex. 9 | polypropylene | — | 6,10-nylon | 0 |
| Comp. Ex. | — | — | — | 10 |

As may be seen from Table 1, leakage was noticed in all of ten batteries of the Comparative Example in which no rings are fitted on the negative electrode terminals, whereas, in the batteries of the Examples 1 to 9, in which the rings are fitted to stop the degassing holes formed in the negative electrode terminals, not more than three batteries were subjected to leakage. From this it is seen that, by stopping up the degassing hole in the negative electrode terminal with a ring, leakage of the battery can be diminished appreciably.

9. The battery according to claim 8 wherein said flange extends from said electrode terminal to said battery case.

10. The battery according to claim 1 further comprising a reinforcement member having a release opening positioned above said sealing member.

11. The battery according to claim 1 wherein said safety valve comprises a reduced thickness portion of said sealing member.

* * * * *